United States Patent
Carter, Sr.

(10) Patent No.: US 6,327,957 B1
(45) Date of Patent: Dec. 11, 2001

(54) WIND-DRIVEN ELECTRIC GENERATOR APPARATUS OF THE DOWNWIND TYPE WITH FLEXIBLE CHANGEABLE-PITCH BLADES

(75) Inventor: J.. Warne Carter, Sr., Wichita Falls, TX (US)

(73) Assignee: Wind Eagle Joint Venture, Wichita Falls, TX (US)

( * ) Notice: Subject to any disclaimer, the term of this patent is extended or adjusted under 35 U.S.C. 154(b) by 0 days.

(21) Appl. No.: 09/227,739

(22) Filed: Jan. 8, 1999

Related U.S. Application Data

(60) Provisional application No. 60/070,843, filed on Jan. 9, 1998.

(51) Int. Cl.[7] .................... B63H 3/00; B64C 11/06
(52) U.S. Cl. .................................. 91/41; 416/159
(58) Field of Search ................ 416/41, 147, 148, 416/155, 156, 157 R, 158, 159, 162, 223 R, 226, 229 R, 230

(56) References Cited

U.S. PATENT DOCUMENTS

| | | |
|---|---|---|
| Re. 30,713 * | 8/1981 | Erris et al. ......................... 416/141 |
| 315,261 | 4/1885 | Edwards . |
| 542,146 | 7/1895 | Crawford . |
| 763,037 | 6/1904 | Balgemann . |
| 1,707,235 | 4/1929 | Sargent . |
| 1,820,529 | 8/1931 | Darrieus . |
| 1,886,289 | 11/1932 | Miller et al. . |
| 2,620,888 | 12/1952 | Avery . |
| 2,655,604 | 10/1953 | Hütter . |
| 2,832,895 * | 4/1958 | Hutter .............................. 416/41 X |
| 3,700,351 | 10/1972 | Flux .................................... 416/123 |
| 3,713,751 | 1/1973 | Fradenburgh et al. ............... 416/87 |
| 3,720,387 | 3/1973 | Foote ................................. 244/17.25 |
| 3,844,680 | 10/1974 | Säterdal ............................. 416/157 |
| 4,003,676 * | 1/1977 | Sweeney et al. ................. 416/132 B |
| 4,020,781 | 5/1977 | Bellew ................................ 115/34 A |
| 4,034,174 | 7/1977 | McCord ........................ 200/81.9 R |
| 4,037,986 | 7/1977 | Chilman ................................ 416/46 |
| 4,083,651 * | 4/1978 | Cheney, Jr. et al. .................. 416/18 |
| 4,095,918 | 6/1978 | Mouton, Jr. et al. ..................... 415/7 |
| 4,183,715 | 1/1980 | Ducker ................................... 416/41 |
| 4,201,514 * | 5/1980 | Huetter ........................ 416/132 B X |
| 4,221,541 | 9/1980 | Bianchi ............................ 416/157 R |
| 4,310,284 | 1/1982 | Randolph ........................ 416/132 B |
| 4,311,434 * | 1/1982 | Abe ..................................... 416/142 |
| 4,329,117 * | 5/1982 | Doman ........................... 416/170 R |
| 4,332,525 * | 6/1982 | Cheney, Jr. ...................... 416/134 A |
| 4,340,822 * | 7/1982 | Gregg .................................... 290/55 |
| 4,349,317 * | 9/1982 | Desjardins ....................... 416/134 A |
| 4,352,629 * | 10/1982 | Cheney, Jr. ........................... 416/18 |
| 4,366,387 | 12/1982 | Carter, Jr. et al. ..................... 290/55 |
| 4,378,198 | 3/1983 | Pettersson ........................... 416/140 |
| 4,381,902 | 5/1983 | Head et al. ...................... 416/134 A |

(List continued on next page.)

Primary Examiner—John E. Ryznic
(74) Attorney, Agent, or Firm—Miles & Stockbridge P.C.

(57) ABSTRACT

A wind-driven electric generator of the downwind type has a wind turbine rotor with oppositely disposed flexible blades attached to the hub of a drive shaft by a flexible spar extending from the hub into hollow portions of the blades. The ends of the spar are attached to intermediate regions of the blades by respective ball joints. Each blade has a root-rib with a stub shaft that is slidably supported in a ball joint mounted on the hub. The blades are pitched to a stall position by a collective pitch mechanism in the absence of proper operating conditions. A nacelle cover of the wind turbine defines an airflow path through the head, and an airflow responsive device inside the nacelle cover controls the collective pitch mechanism to place the blades in a stall position or run position depending upon predetermined airflow conditions. A reverse-cone prevention device limits the ability of the blades to cone reversely.

33 Claims, 19 Drawing Sheets

U.S. PATENT DOCUMENTS

| | | |
|---|---|---|
| 4,403,918 | 9/1983 | Schramm ............................ 416/138 |
| 4,415,813 | 11/1983 | Carme ................................. 290/44 |
| 4,431,375 | 2/1984 | Carter, Jr. et al. ............... 416/132 B |
| 4,435,646 | 3/1984 | Coleman et al. ....................... 290/44 |
| 4,443,154 | 4/1984 | Randolph ............................. 416/11 |
| 4,449,889 | 5/1984 | Belden ................................. 416/16 |
| 4,515,525 * | 5/1985 | Doman ................................ 416/11 |
| 4,522,561 | 6/1985 | Carter, Jr. et al. ..................... 416/11 |
| 4,522,564 | 6/1985 | Carter, Jr. et al. ................... 416/140 |
| 4,527,072 | 7/1985 | van Degeer ............................ 290/55 |
| 4,533,297 | 8/1985 | Bassett ............................ 416/132 B |
| 4,545,728 * | 10/1985 | Cheney, Jr. ............................. 416/11 |
| 4,549,851 | 10/1985 | Pariani ................................. 416/140 |
| 4,565,929 * | 1/1986 | Baskin et al. ......................... 290/44 |
| 4,616,977 | 10/1986 | Schramm ............................ 416/138 |
| 4,632,637 | 12/1986 | Traudt ................................. 416/41 |
| 4,641,039 | 2/1987 | Carre .................................... 290/44 |
| 4,690,615 | 9/1987 | Kuntze-Fechner et al. ..... 416/134 A |
| 4,704,067 * | 11/1987 | Fisher .................................. 416/167 |
| 4,746,272 * | 5/1988 | Noehren et al. .................. 416/134 A |
| 4,767,939 | 8/1988 | Calley .................................... 290/55 |
| 4,773,824 | 9/1988 | Kiss ................................. 416/168 A |
| 4,792,281 | 12/1988 | Coleman ............................. 416/156 |
| 4,909,703 | 3/1990 | Jacobs ................................... 416/89 |
| 4,931,776 | 6/1990 | Klos et al. ............................ 340/610 |
| 4,976,587 * | 12/1990 | Johnston et al. ..................... 416/230 |
| 4,990,205 * | 2/1991 | Barbier et al. .................. 416/230 X |
| 5,096,381 * | 3/1992 | Svenning ...................... 416/168 R X |
| 5,100,294 * | 3/1992 | Crannage et al. ............... 416/134 A |
| 5,178,518 * | 1/1993 | Carter, Sr. ............................. 416/11 |
| 5,188,513 | 2/1993 | Byrnes ............................ 416/134 A |
| 5,254,876 | 10/1993 | Hickey .................................. 290/55 |
| 5,354,175 | 10/1994 | Coleman et al. ........................ 416/9 |
| 5,506,453 | 4/1996 | McCombs ............................. 290/44 |
| 5,584,655 * | 12/1996 | Deering ................................. 416/31 |
| 5,585,655 | 12/1996 | Deering ................................. 416/31 |
| 5,636,969 | 6/1997 | Matuska et al. ........................ 416/87 |

* cited by examiner

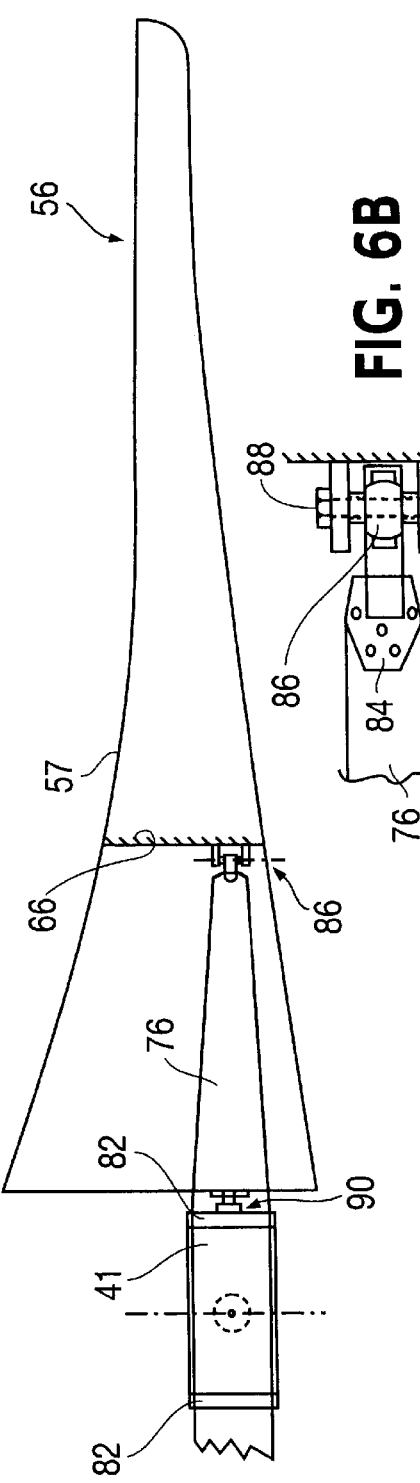
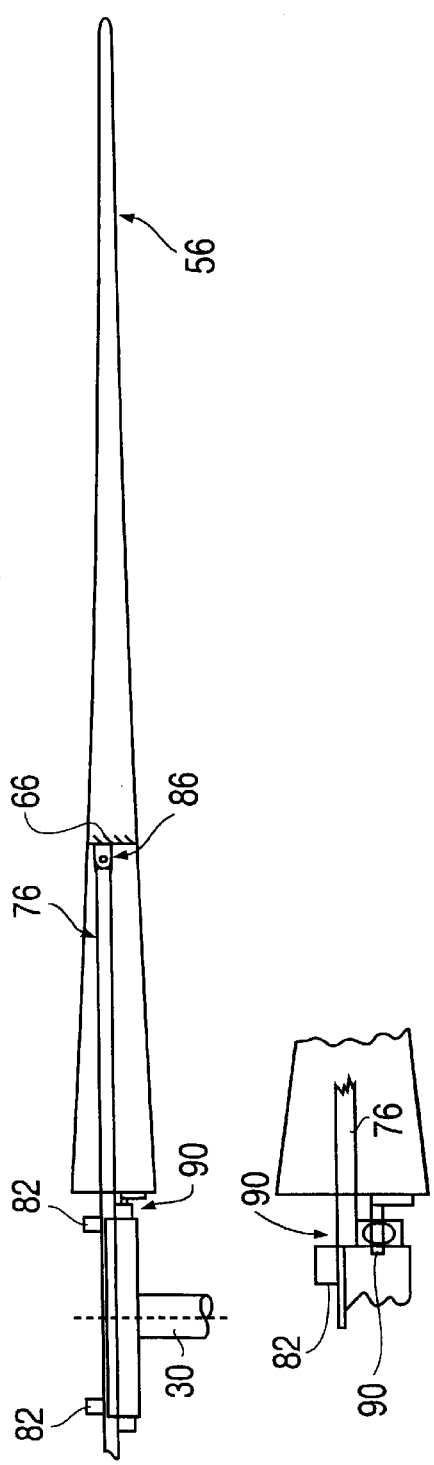

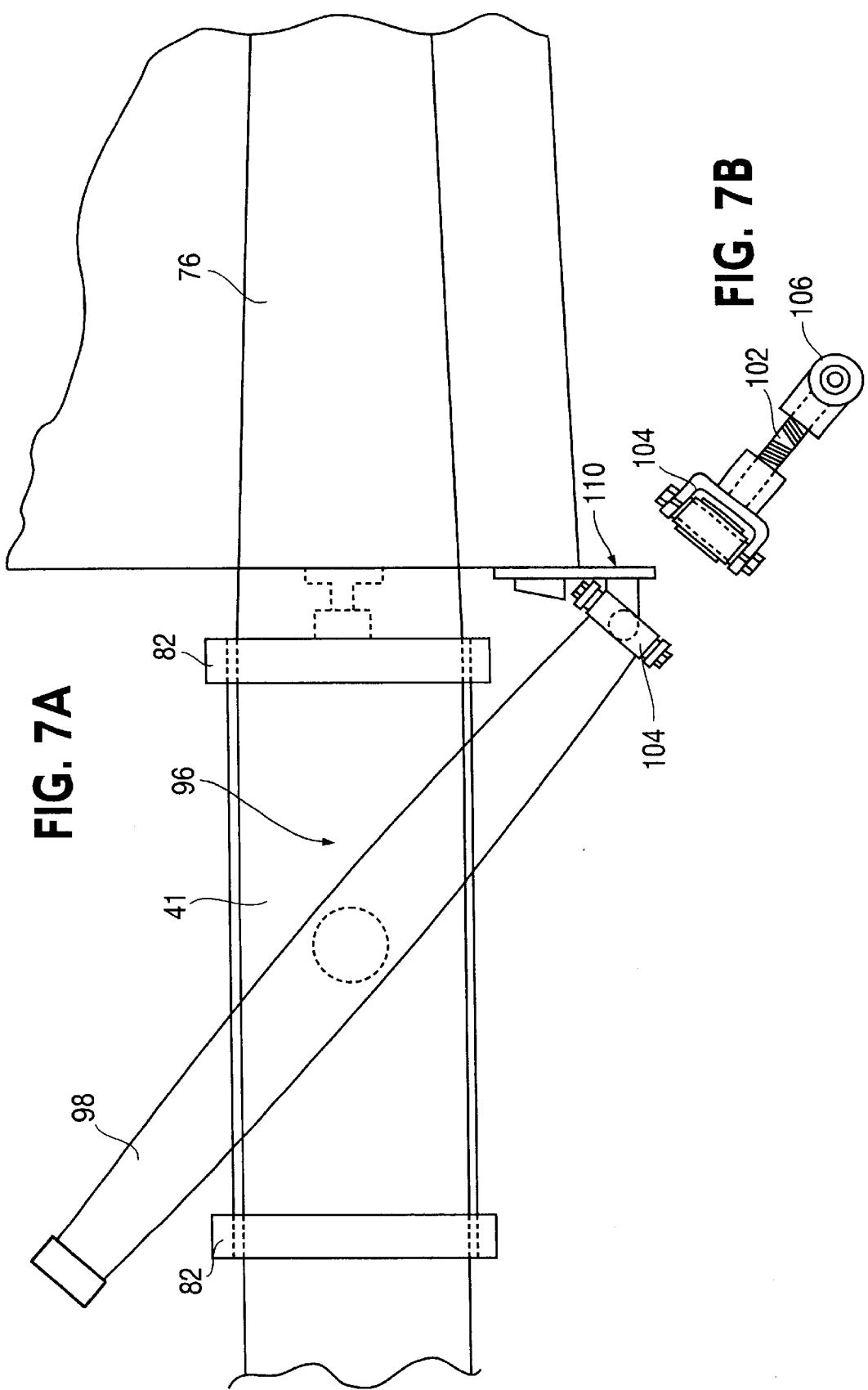

WIND-DRIVEN ELECTRIC GENERATOR APPARATUS OF THE DOWNWIND TYPE WITH FLEXIBLE CHANGEABLE-PITCH BLADES

CROSS REFERENCE TO RELATED APPLICATION

This application claims the benefit of provisional application No. 60/070,843 filed Jan. 9, 1998, and incorporated herein by reference.

BACKGROUND OF THE INVENTION

This invention is concerned with wind-driven electric generators of the downwind type having flexible blades capable of downwind coning and pitch control by a collective pitch mechanism.

Wind-driven electric generators, commonly referred to as "wind turbines," have proved their ability to generate substantial amounts of electricity in proper operating environments. However, most wind turbines presently in use are heavy machines with rigid blades and are expensive to manufacture and maintain. Because of their rigidity, structural loads tend to be very high, and the entire wind turbine must be heavy enough and strong enough to withstand such loads.

Structural loads can be reduced by designing flexibility or compliance in the wind turbine rotor.

Examples of downwind wind turbines with flexible blades are described in U.S. Pat. No. 5,178,518 issued Jan. 12, 1993 to Carter, Sr., U.S. Pat. No. 4,431,375 issued Feb. 14, 1984 to Carter, Jr. et al, and U.S. Pat. No. 4,366,387 issued Dec. 28, 1982 to Carter, Jr., et al, all of which are incorporated herein by reference.

It is desirable that the wind turbine be constructed in a manner that takes maximum benefit of blade flexibility and weight reduction, while providing high strength and reduced manufacturing and maintenance costs. Also, it is desirable that the wind turbine be constructed to run only when operating conditions are appropriate. The present invention provides such wind turbines.

BRIEF DESCRIPTION OF THE INVENTION

In accordance with one aspect of the invention, flexible, oppositely disposed rotor blades are mounted on a hub of a drive shaft by means of a flexible spar that is attached to the hub and that extends therefrom into hollow interior portions of the blade shells, the ends of the flexible spar being attached to the blades by ball joints. In a preferred embodiment, each blade has a root-rib with an opening through which the spar extends freely, and the root-rib has a blade pitch pivot with a stub shaft that is slidable in a ball joint mounted on the hub. The root-ribs are coupled to a pitch-changing mechanism by which the pitch of the blades is changed, collectively rather than individually, between run and stall positions.

In a preferred embodiment, the collective pitch mechanism comprises a pitch beam extending transversely of the drive shaft and having linkages at opposite ends thereof that couple the pitch beam to the root-ribs. Each linkage includes a tie-rod, one end of which is connected to an end of the pitch beam by a clevis, and the other end of which is connected to the root-rib by a ball joint. The pitch beam has a shaft portion that reciprocates within the drive shaft of the wind turbine to change the pitch of the blades.

In a preferred embodiment, a nacelle cover of the wind turbine head defines an airflow path through the head, and an airflow responsive device, such as a swing door inside the nacelle cover, controls the movement of the pitch beam. By virtue of this arrangement, predetermined airflow conditions, based on desired run and non-run conditions of the wind turbine, determine whether the rotor blades are in the run or stall position.

The flexible rotor blades are designed to cone in a downwind direction. In a preferred embodiment, to minimize the risk of a blade striking a tower of the wind turbine, the ability of the blades to cone reversely, i.e., in the upwind direction when the rotor is downwind, or in the downwind direction when the rotor is upwind, is limited. Such limitation may be provided by a stiff spar mounted on the hub behind the flexible spar.

BRIEF DESCRIPTION OF THE DRAWINGS

The invention will be further described in conjunction with the accompanying illustrations, showing preferred (best mode) embodiments of the invention, and wherein:

FIGS. 6A–D are diagrammatic views showing the manner in which a blade is attached to the hub in accordance with the invention;

FIGS. 7A and 7B are diagrammatic views showing portions of a pitch-changing mechanism employed in the invention;

DETAILED DESCRIPTION OF THE INVENTION

Figure 1:
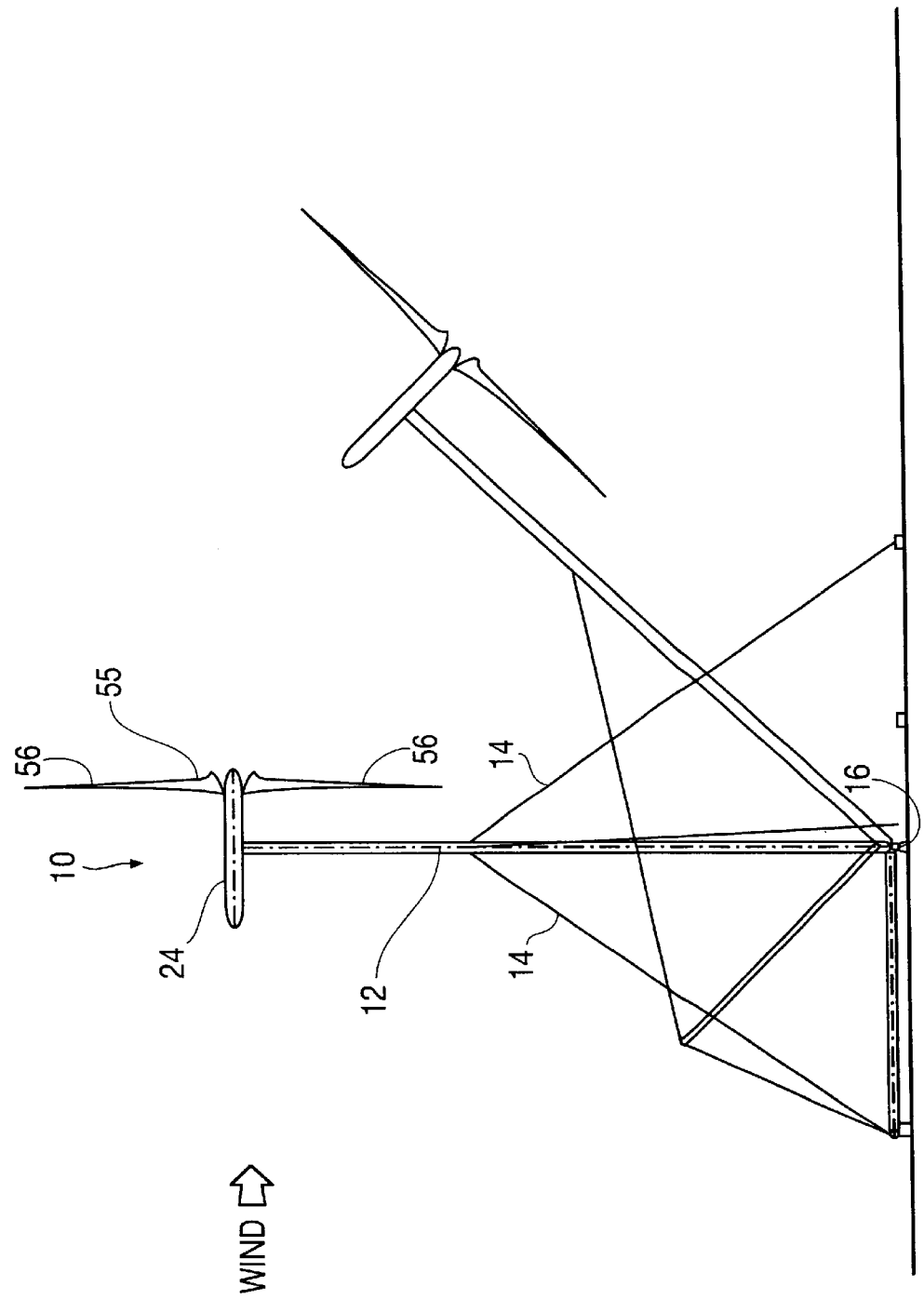
FIG. 1 is a diagrammatic side elevation view of a wind turbine in accordance with the invention.

As shown in FIG. 1, the wind-driven generator apparatus of the invention comprises a turbine head 10 supported on a tower 12 for wind-driven yaw movement about a substantially vertical yaw axis. The tower may be stabilized by guy wires 14, and the bottom of the tower may be supported on a bearing 16 that permits the turbine head to be lowered for maintenance.

Figure 2:
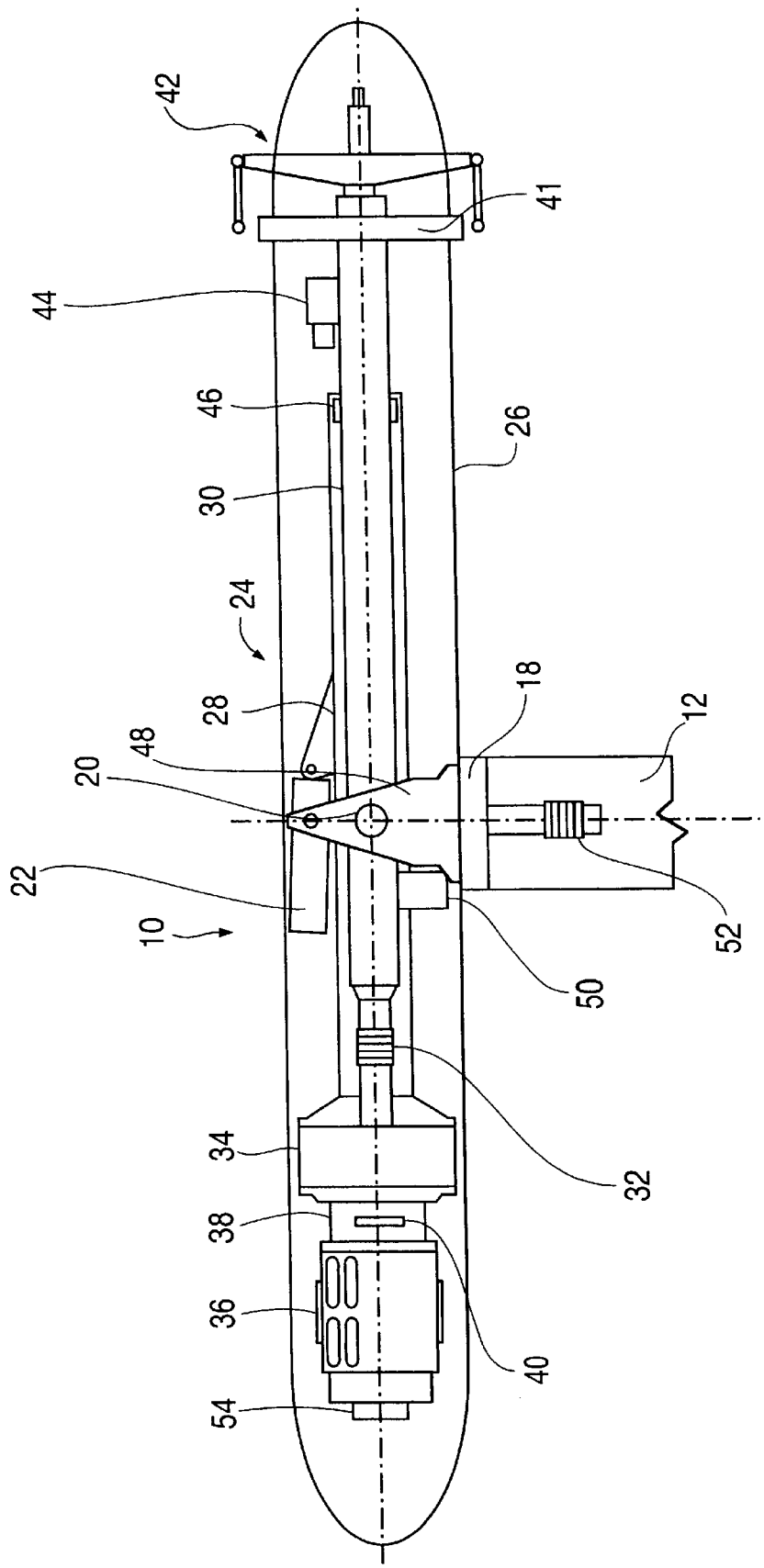
FIG. 2 is a diagrammatic side elevation view of a head portion of the wind turbine.

As shown in FIG. 2, the turbine head 10 is preferably mounted on a yaw bearing 18 by a tilt pivot 20 which permits the entire head to be tilted upwardly and downwardly relative to the tower through a limited angular range, and the tilt movement may be moderated by a tilt damper 22, as described in the aforesaid U.S. Pat. No. 5,178,518.

A nacelle 24 of the turbine head has a cover 26 that encloses a mainframe 28 in which a low speed drive shaft 30 is supported for rotation about an axis transverse to the yaw axis (and transverse to the tilt pivot axis). One end of the low speed shaft (provided with slip rings 32 for electrical connection) is connected to a gear box 34 containing a gear train that drives a generator 36, at relatively high speed, through a generator adapter 38 and one-way clutch 40 (that prevents reverse rotation of the rotor). Also shown in FIG. 2 is a rotor hub 41 fixed transversely to the drive shaft, a pitch assembly 42, a blade pitch hydraulic unit 44 (all of which will be. described in greater detail later) a main bearing 46, a trunnion support 48 for the tilt pivot, a yaw drive 50, yaw slip rings 52 (for electrical connection) and a brake 54. The yaw drive may be used to position the turbine head azimuthly, but the turbine head is then capable of substantially free wind-driven yaw movement. A yaw damper (not shown) may also be provided. The brake 54 is used merely to park the wind turbine, to prevent any rotation of the rotor.

Figure 3:
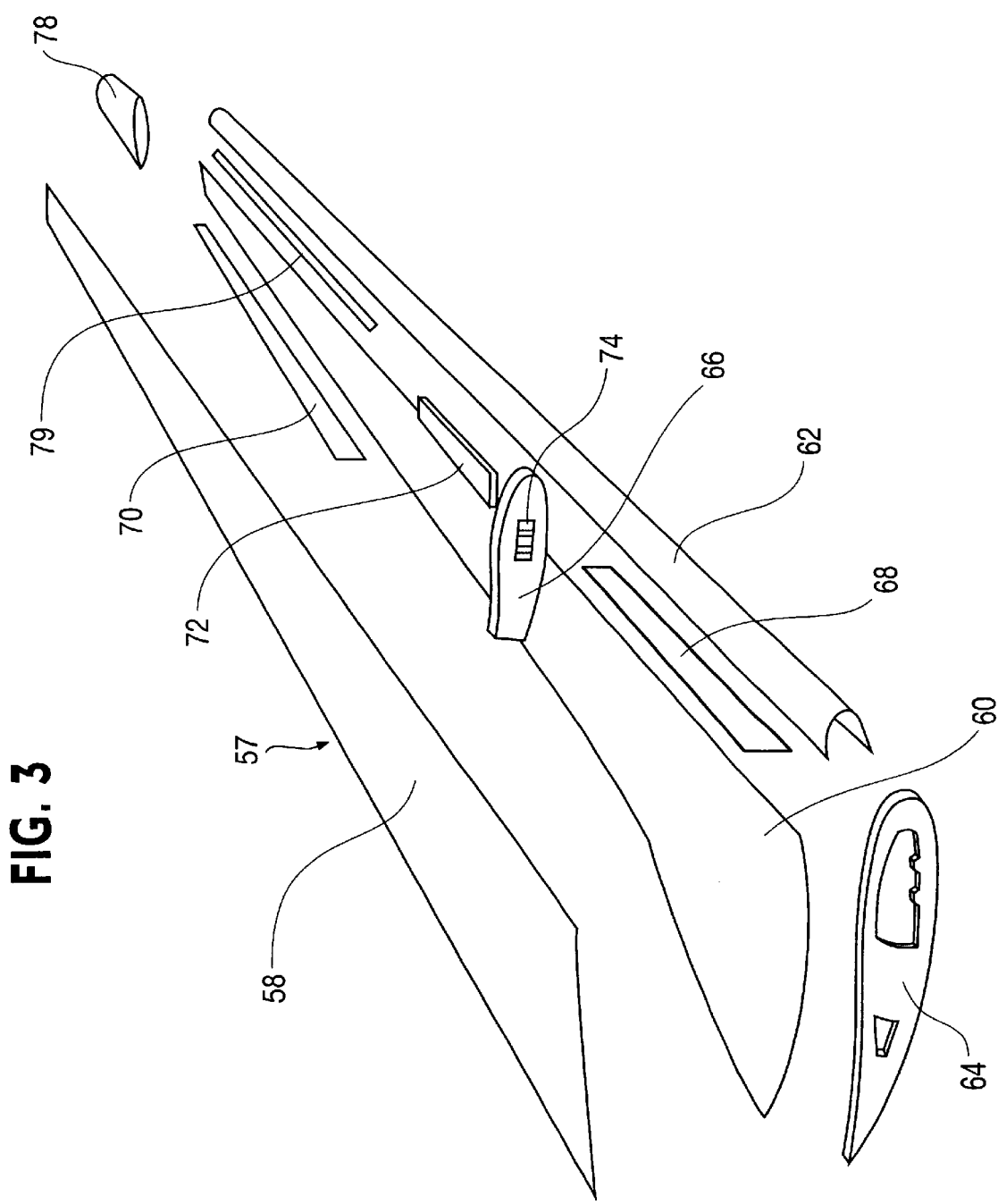
FIG. 3 is a diagrammatic exploded perspective view showing major parts of a rotor blade that may be employed in the invention.
Figure 4:
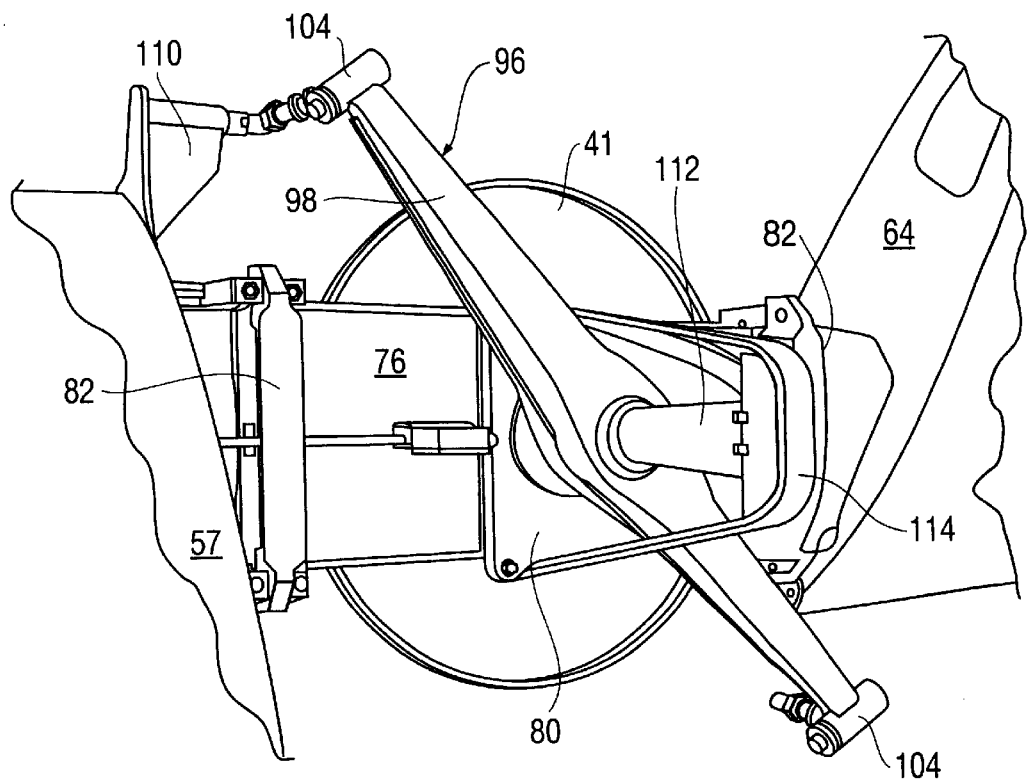
FIG. 4 is a perspective view of a rotor hub, flexible span, pitch system and blade root ends employed in the invention.
Figure 5:
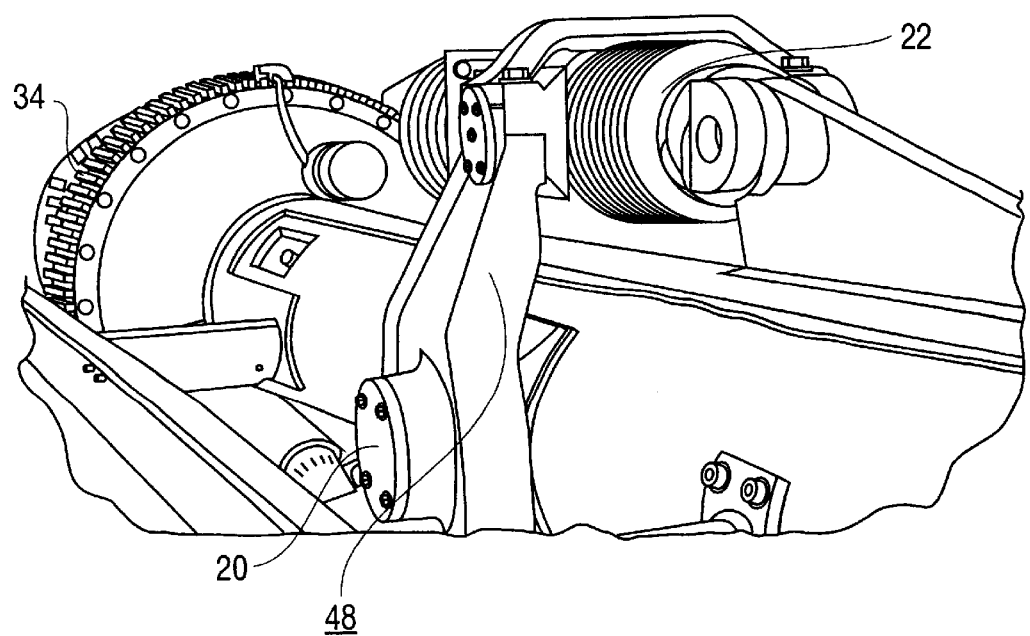
FIG. 5 is a perspective-view of a mainframe, tilt system, and gear box which may be employed in the invention.

As shown in FIG. 1, a rotor 55 of the wind turbine comprises a pair of oppositely disposed flexible blades 56, each of which may be constructed as shown in FIG. 3. Each blade comprises a blade shell 57 constructed from three main components and several smaller parts which are bonded together during final assembly. The blade takes its shape from an upwind skin 58, a downwind skin 60, and a leading edge piece 62. The structure of the blade includes a root-rib 64 and a mid-rib 66. The mid-rib has longitudinal shear webs 68 and 70 located inboard and outboard of its position. A subspar 72 is bonded to the mid-rib. A steel fitting 74 on the subspar is used to attach the blade shell to the end of a flexible spar 76 (flexbeam). As shown in FIG. 4, the flexible spar extends continuously across the drive shaft and has a hole through which the drive shaft projects.

Also shown in FIG. 3 are a blade tip 78 and a blade ballast 79. All of the parts shown become integrated during manufacture, Both the flexible spar 76 and the blade shells 57 are preferably constructed of high quality, vacuum-bagged, E-glass/epoxy composite and are designed for high. flexibility in the flatwise direction. The upwind and downwind blade skins comprise unidirectional and ±45° E-glass reinforcement. Polyvinyl chloride (PVC) foam coring is used for panel stiffening.

The hub 41 is made from structural steel plate welded into a rectangular box structure, and the flexible spar 76 attaches to the downwind side of the hub with a central clamp plate 80 and two outboard spar clamps 82. See FIG. 4. The low speed shaft 30, constructed from steel pipe for much of its length, is welded to the hub 41 on the downwind side. The shaft has a solid steel shaft segment welded to the pipe section on the upwind side, which is splined on the end to mate with a planet gear carrier of the gear box 34.

The flexible spar 76 is constructed primarily of continuous, filament-wound unidirectional fiberglass. It tapers width-wise and thickness-wise, so that it is largest in both width and thickness dimensions where it clamps onto the hub, and has minimum width and thickness toward its opposite ends. In the preferred embodiment, there is no pre-cone angle built into the hub or flexible spar.

Figure 8:
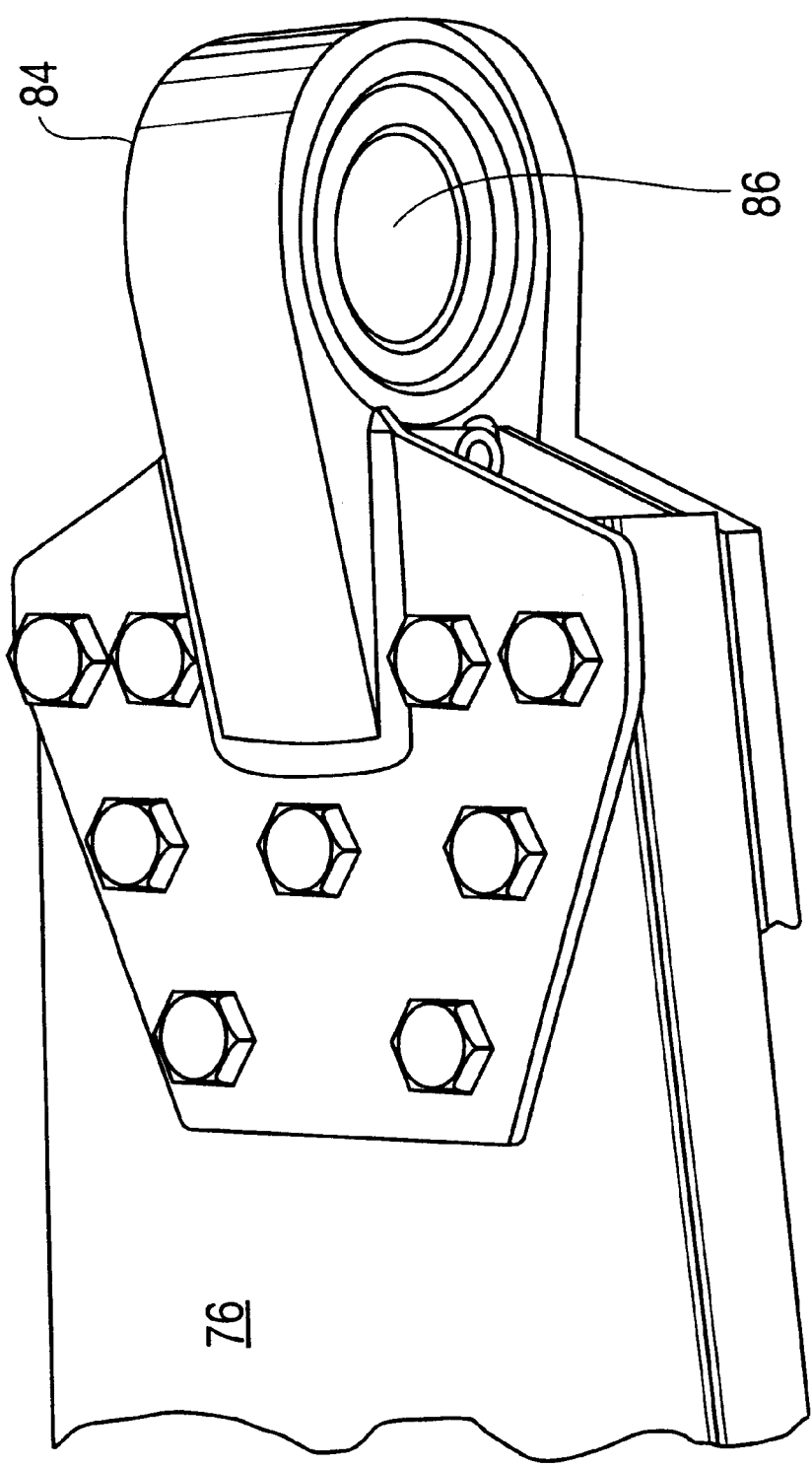
FIG. 8 is a perspective view of a portion of a flexible spar and attachment fitting employed in the invention.
Figure 9:
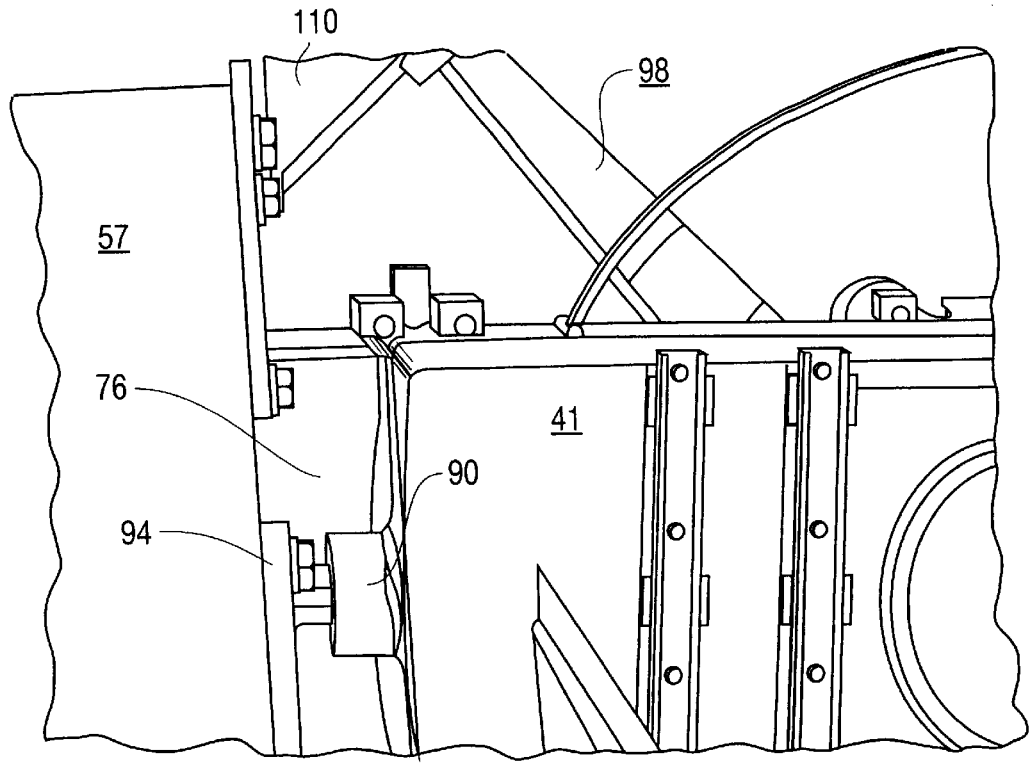
FIG. 9 is a perspective view showing details of attachment of a blade to the hub and portions of the pitch-changing mechanism in accordance with the invention.
Figure 10:
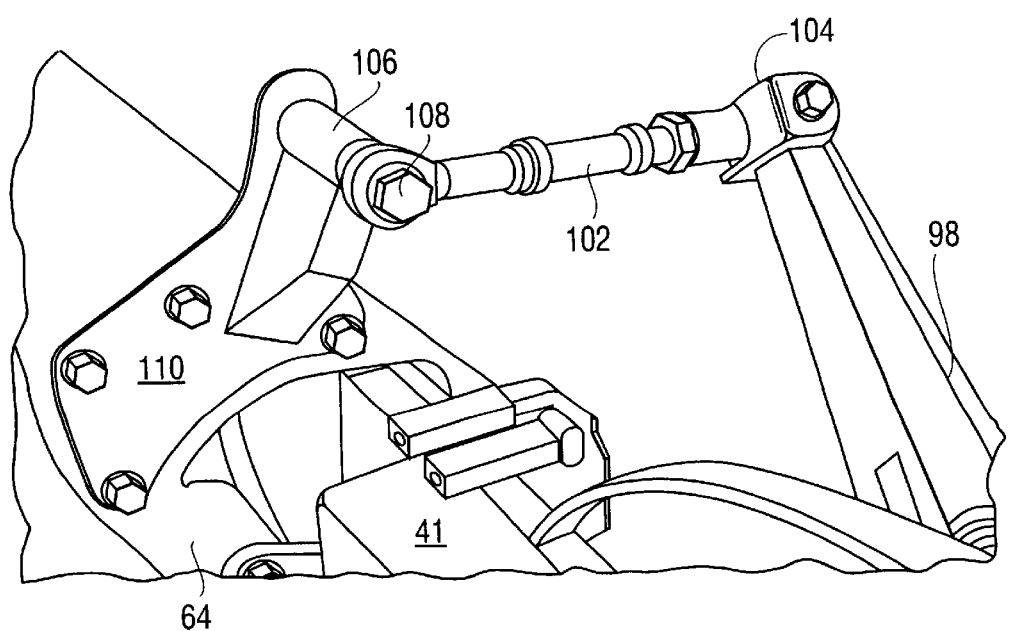
FIG. 10 is a perspective view showing details of the pitch-changing mechanism.
Figure 11:
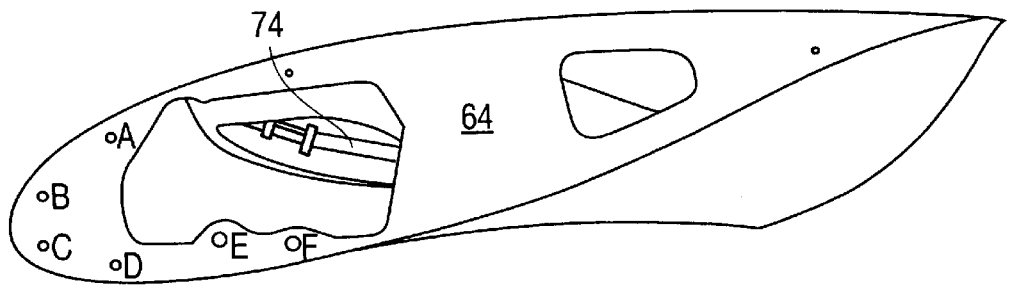
FIG. 11 is a side elevation view showing the root end of a blade.
Figure 12:
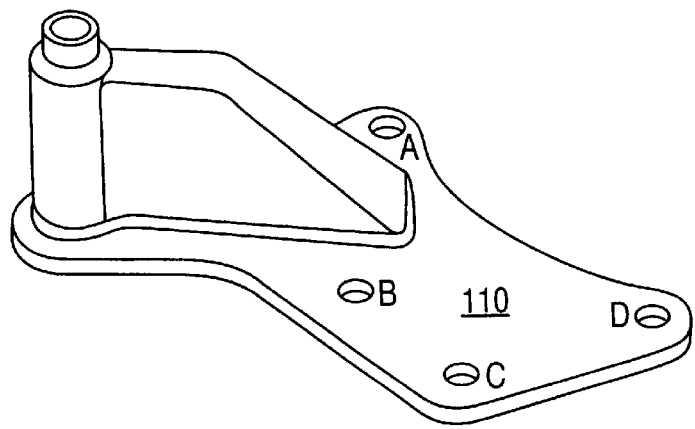
FIG. 12 is a perspective view showing a blade arm of the pitch-changing mechanism.
Figure 13A:
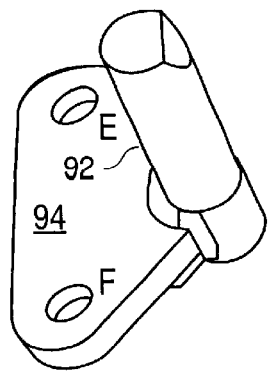
FIGS. 13A and 13B are perspective views showing a blade pitch pivot bracket.
Figure 13B:
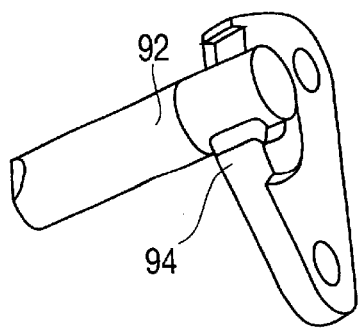
Figure 14:
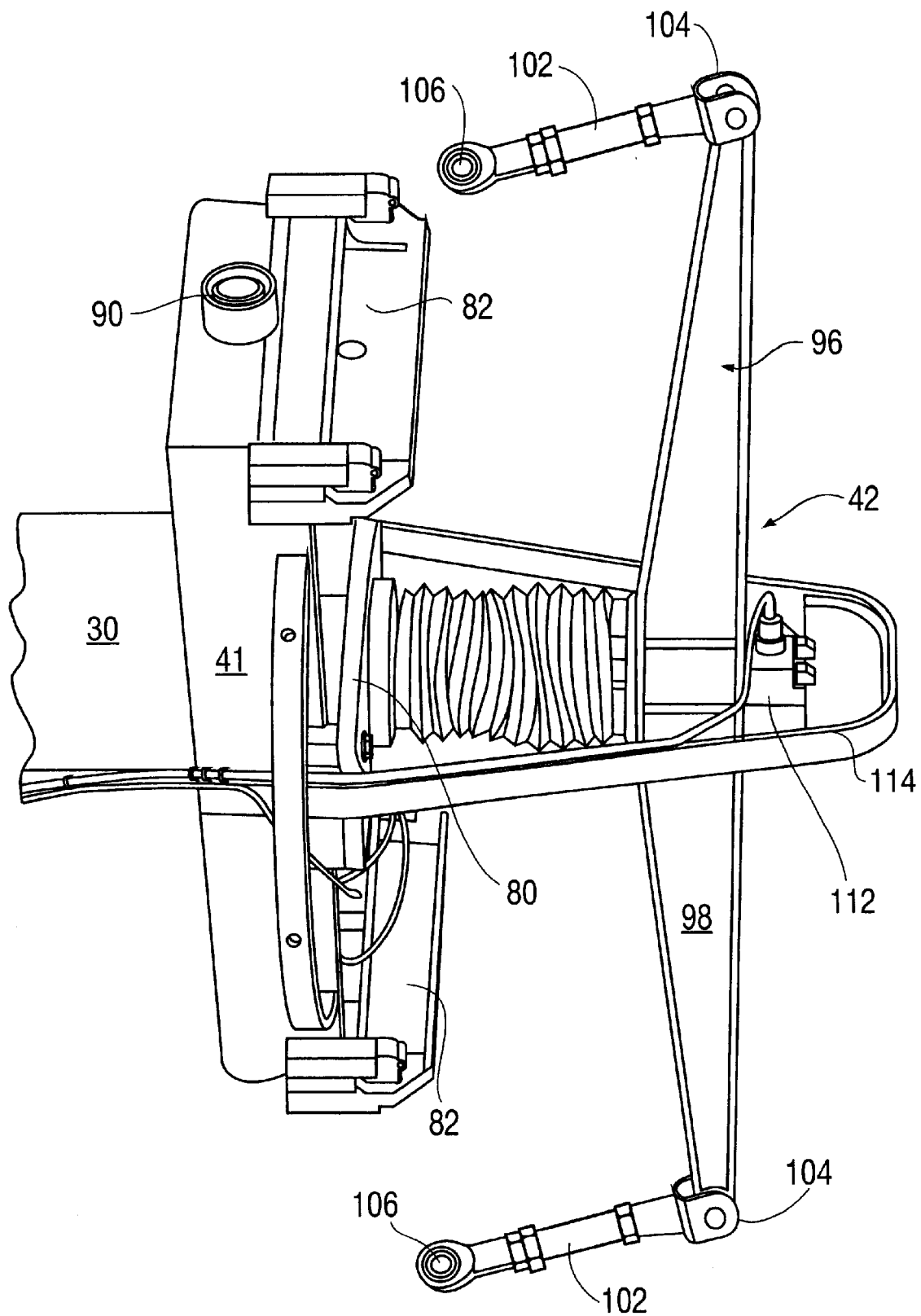
FIG. 14 is a perspective view showing the hub and a portion of the pitch-changing mechanism.
Figure 15:
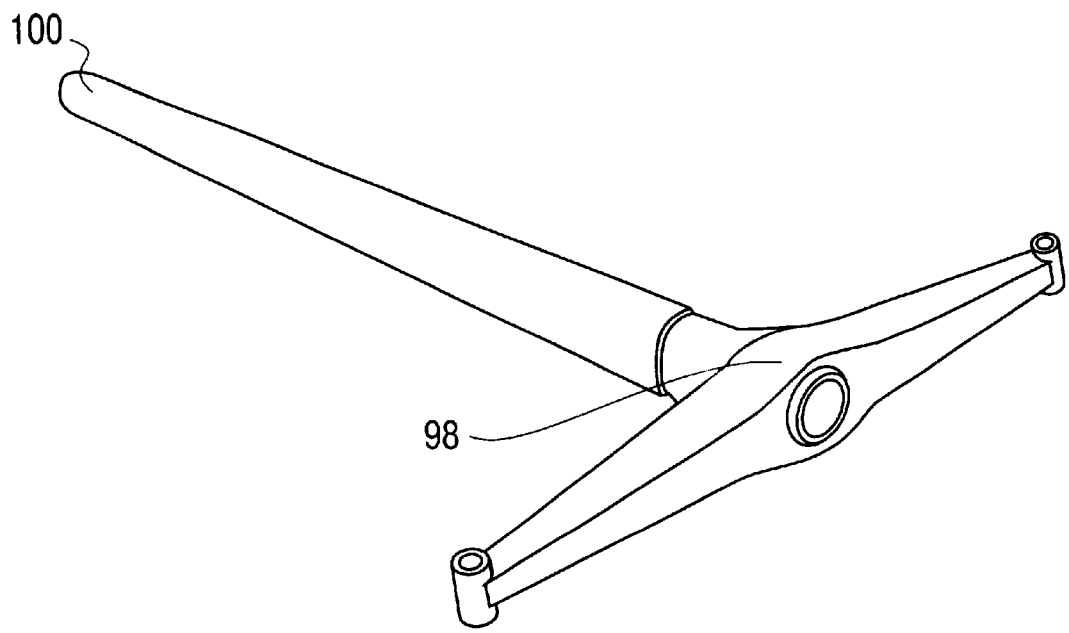
FIG. 15 is a perspective view showing a blade pitch beam employed in the pitch-changing mechanism.
Figure 16:
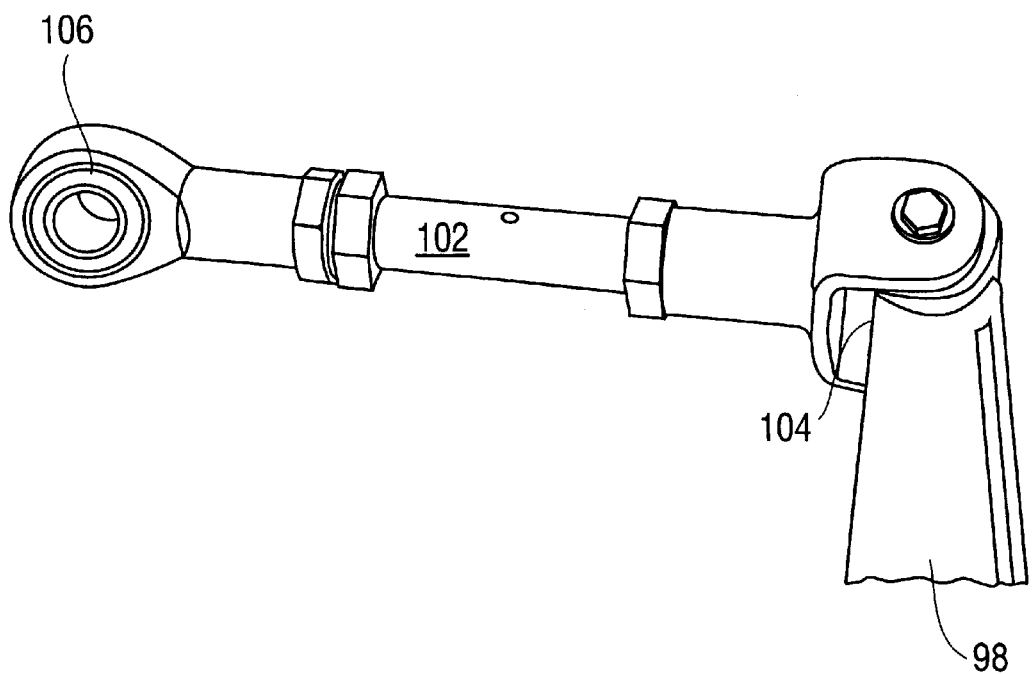
FIG. 16 is a perspective view showing a blade pitch linkage.

As shown in FIG. 8, each outer end of the flexible spar is provided with an attachment ring 84 that includes a ball joint 86 which receives a pin-88 (FIG. 6B) of the attachment fitting 74 on an end of the subspar 72 (FIG. 3) that is bonded to the mid-rib 66. The ball joints at the ends of the flexible spar allow blade pitch from-stall to run position without pre-loading any blade or spar components. In high winds, the flexible spar enables the blades to cone to as high as 45 degrees to unload the blades-from high flapwise bending moments.

The mid-rib 66 fits inside the leading edge part 62 of the blade and has a wide flange for bonding to the leading edge and blade skins 58 and 60. A microglass-epoxy potting compound is used to bond the mid-rib into the leading edge. The subspar 72 is also potted into the leading edge piece and is bonded to the mid-rib. The subspar, which resembles the flexible spar 76 in construction, is composed of unidirectional E-glass rovings in a rectangular cross-section. The subspar is oriented flatwise along the chord line near the neutral axis of the blade. The blade design allows the shell to pitch about the flexible spar without geometric interference from internal structure.

The root-rib 64, which may be formed of aluminum, constitutes the root end of the blade shell 57 and serves as a hard attachment point for a blade arm and a pitch pivot rod bracket, as described hereinafter. The blade can be pitched approximately 24 degrees about the pitch pivot bearing, and it must keep its integrity even when the spar is bent during downwind coning, as described later.

Pitch pivot bearings for the pitch movement of the blades are provided at opposite ends of the hub 41. Each pitch pivot bearing comprises a ball joint 90 on an end of the hub that slidably receives a stub shaft 92 of a pitch pivot bracket 94 attached to a corresponding root-rib 64 of each rotor blade. See FIGS. 6A–6D, 9, 13A, and 14.

A pitch-changing mechanism 96 is used to change the pitch of the blades collectively (rather than individually). As shown in FIGS. 4, 14, 15, and 24, the pitch-changing mechanism comprises a pitch beam.98 extending transversely of the axis of the drive shaft and having a shaft portion 100 that reciprocates within the hollow portion of the drive shaft.

Opposite ends of the pitch beam 98 are coupled to respective blade root-ribs by linkages. See FIGS. 4, 7A, 7B, 10, 14, 16, and 24 Each linkage includes a tie-rod 102, one end of which is connected to a corresponding end of the pitch beam by a clevis 104, that provides only a single degree of freedom in the pivotal movement of the tie-rod relative to the pitch beam. The opposite end of each tie-rod is provided with a ball joint 106 that receives a pin 108 threaded into a bore of a blade arm 110 attached to the root-rib. Threads at the end of the tie-rod allow fine pitch adjustment for the individual blades.

Figure 23:
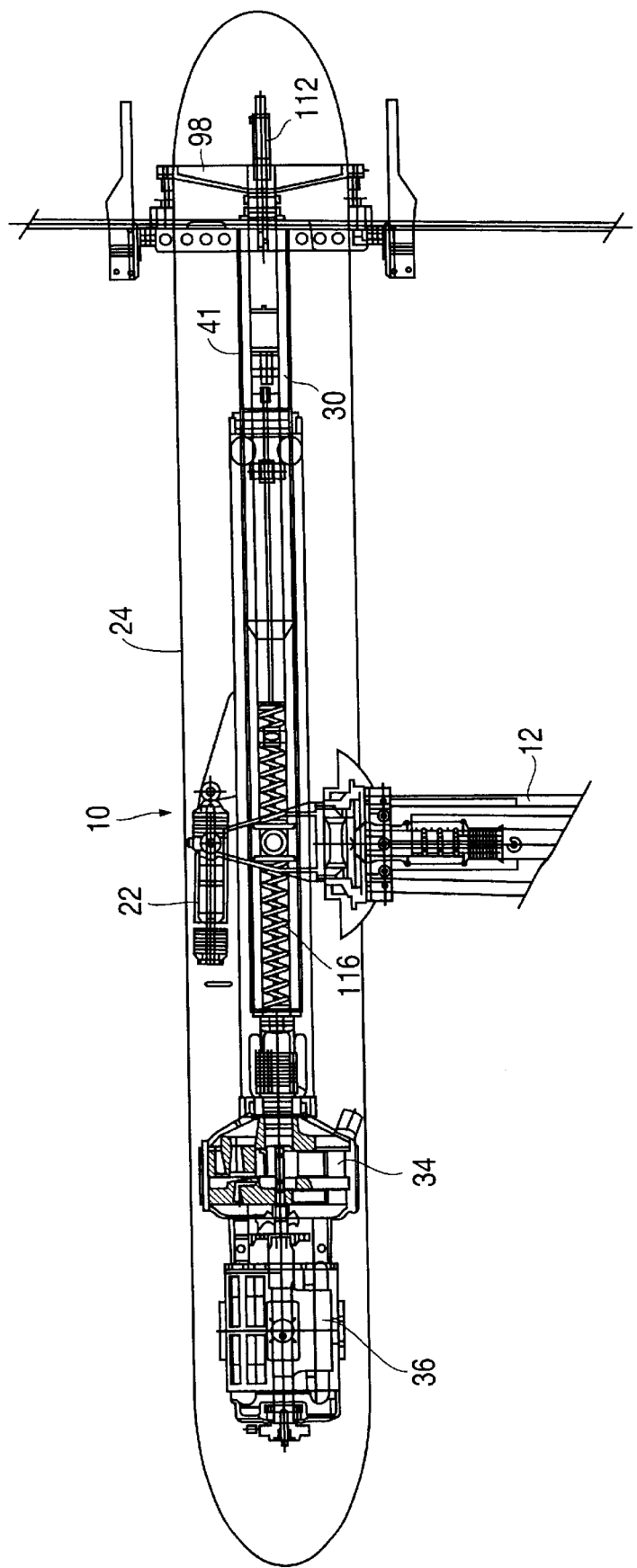
FIG. 23 is a diagrammatic[]view showing details of a head portion of the wind turbine.
Figure 24:
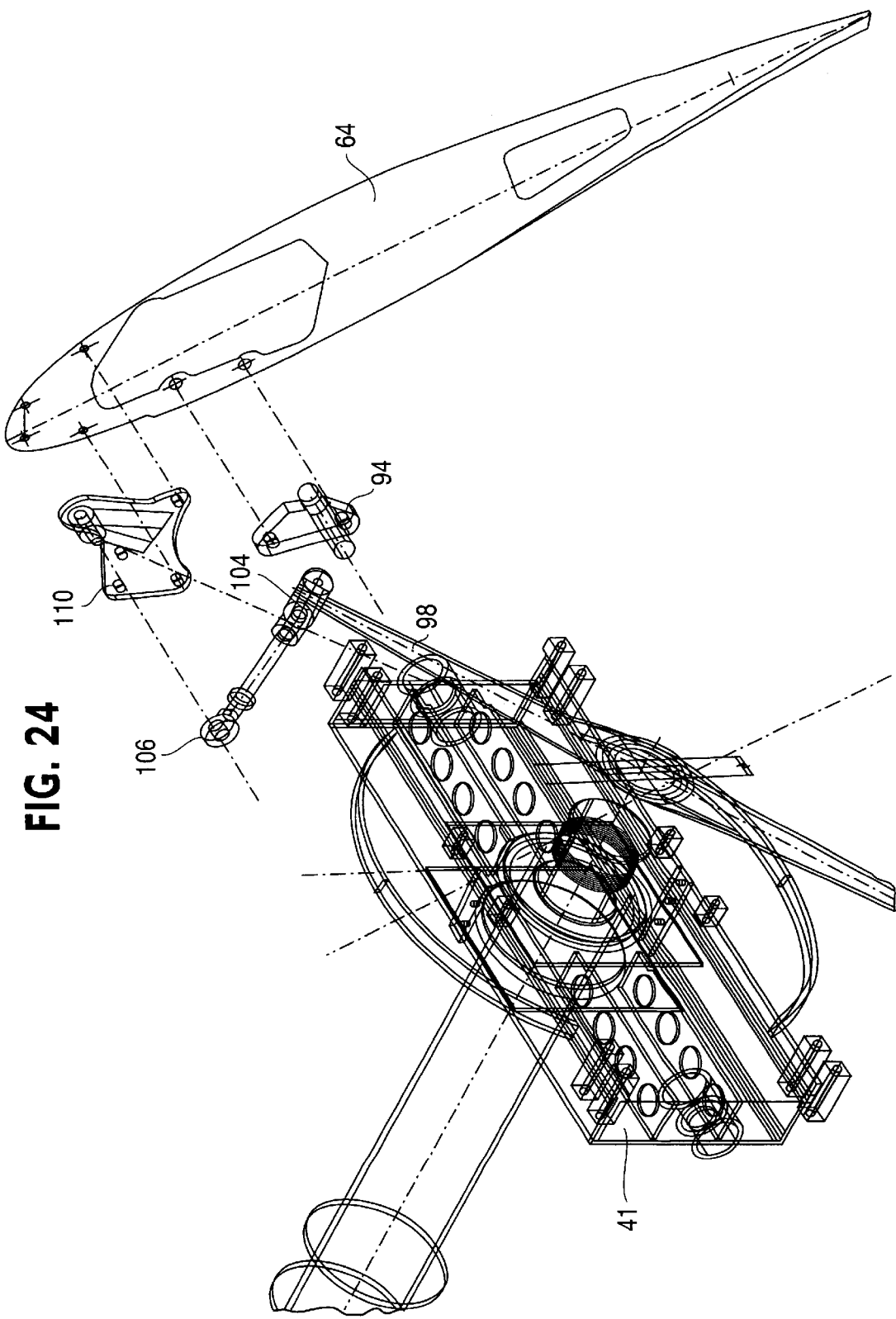
FIG. 24 is a diagrammatic exploded perspective view showing details of the hub and pitch-changing mechanism.

Movement of the pitch beam inwardly of the drive shaft is provided by a hydraulic cylinder pitch actuator 112 (FIGS. 14 and 23) on a pitch yoke 114 attached to the hub 41. Opposite movement of the pitch beam, outwardly of the drive shaft, is provided by a strong compression spring 116 at the innermost end of the shaft portion 100 of the pitch beam. Shaft bellows protect the cylinder seals from dirt and debris.

To pitch the blades to the run position, the hydraulic cylinder of the pitch actuator 112 is charged from a hydraulic fluid supply (not shown) to move the pitch beam inwardly of the drive shaft, so that wind in the downwind direction drives the rotor. To pitch the blades to the stall position, the hydraulic pressure in the cylinder is released, and the strong compression spring 116 drives the pitch beam outwardly of the drive shaft. A thin mechanical tube guides the shaft portion of the pitch beam inside the drive shaft and positions the powerful coil spring against the end of the shaft portion of the pitch beam to permit pre-loading of the blade pitch system. In a shut-down mode, the blades are held in the stalled position by the spring force.

While it was known in the prior art to employ a pitch beam with a hydraulic actuator and a compression spring for moving the pitch beam, and it was known to connect the ends of the pitch beam to root-ribs of blades to change the pitch of the blades in a collective pitch mechanism using a push-pull rod that reciprocates in a hollow drive shaft, the prior arrangement employed ball joints on opposite ends of linkage tie-rods. For this arrangement to work properly, it was necessary that the push-pull rod rotate with the drive shaft, which requires a key-way, splines, and/or hub-supported guide rods connected to the pitch beam. The arrangement of the present invention avoids the need for key-ways, splines, and guide rods, and is simpler to manufacture and maintain, with reduced cost.

Figure 19:
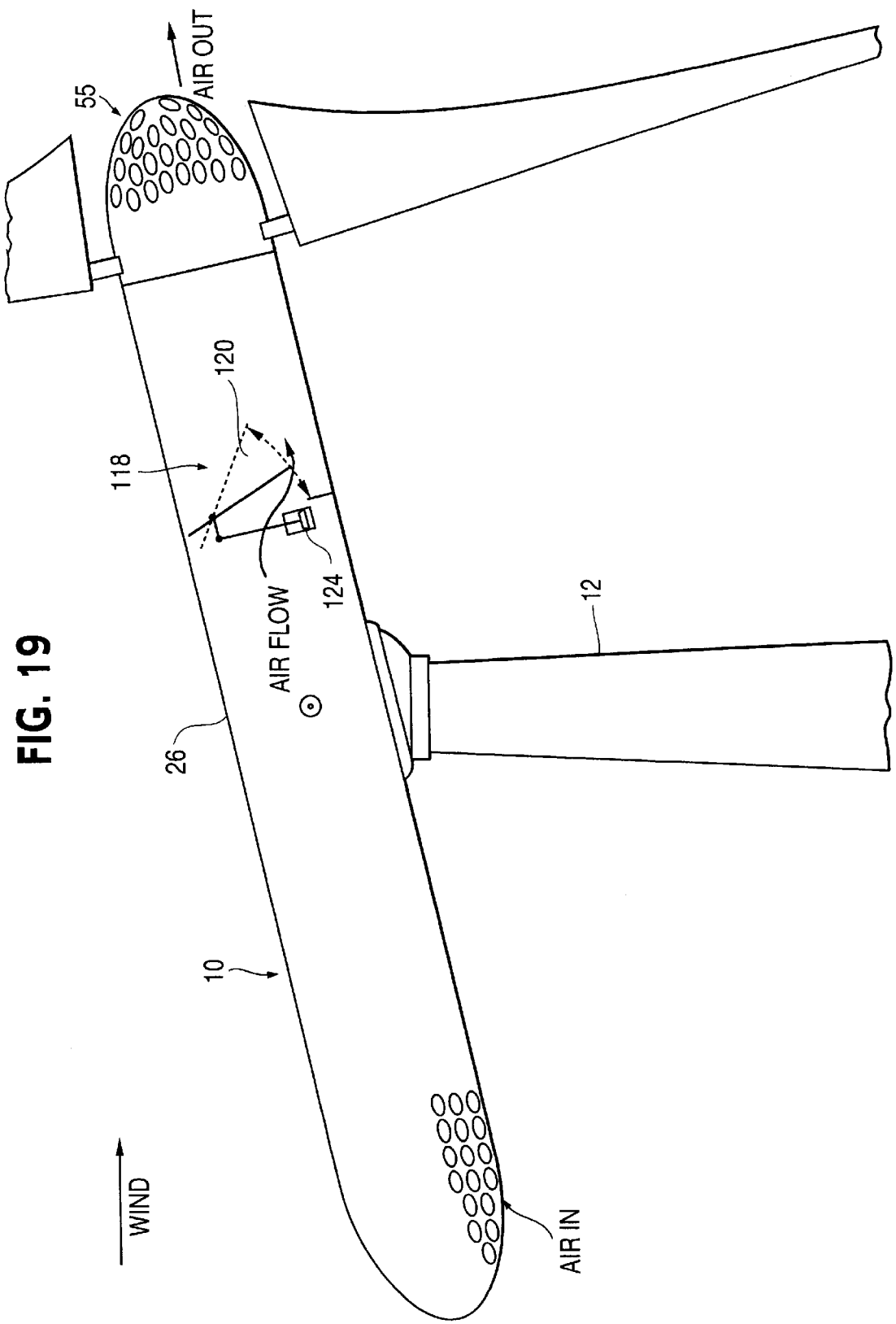
FIG. 19 is a diagrammatic view of an airflow responsive mechanism.
Figure 20:
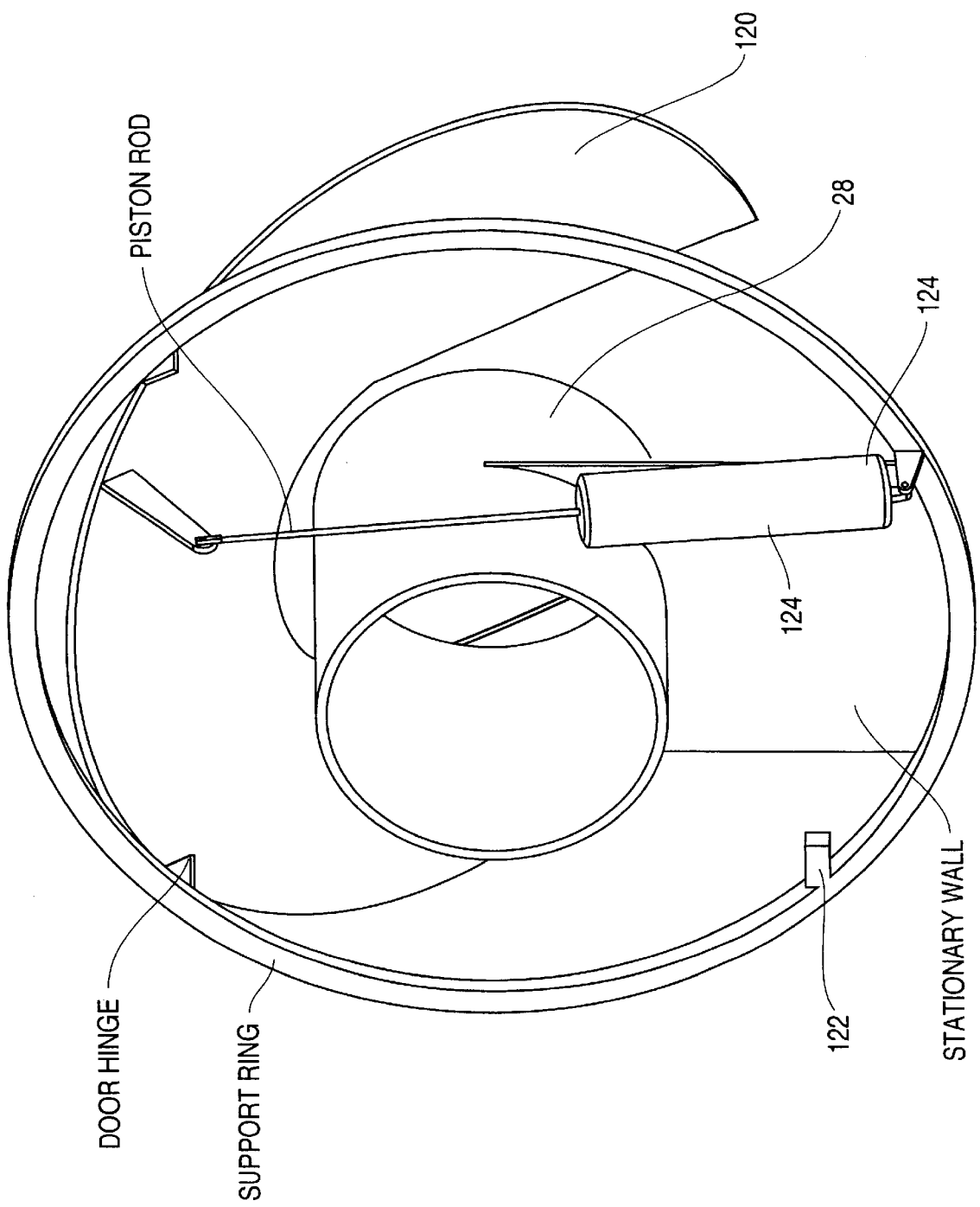
FIG. 20 is a detailed perspective view of portions of the airflow responsive mechanism.
Figure 21:
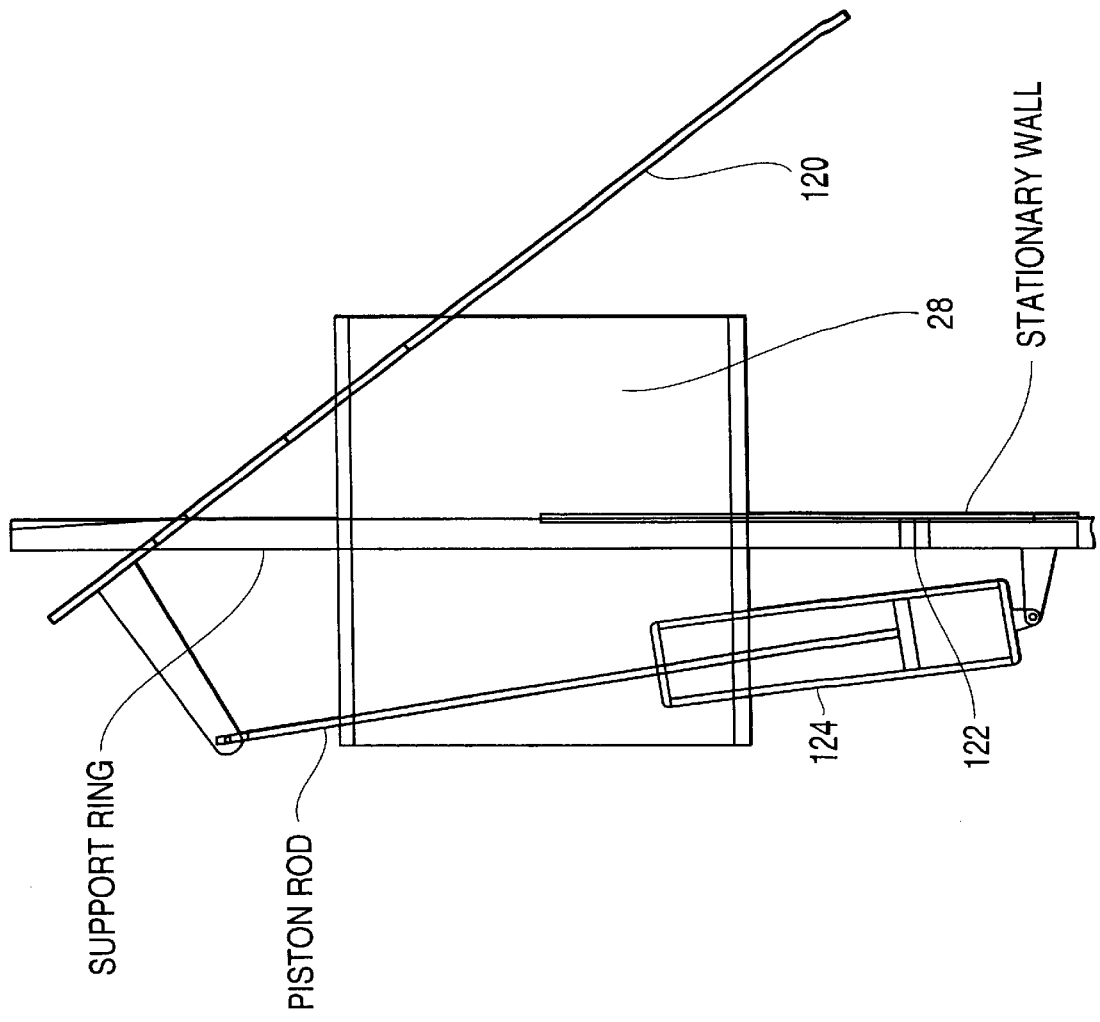
FIG. 21 is a side elevation view corresponding to FIG. 20.

The present invention incorporates a unique mechanism for ensuring that the rotor blades will be pitched to a stall position when conditions are inappropriate for the running of the wind turbine. As shown in FIG. 19, the nacelle cover defines an airflow path between opposite end portions of the turbine head. When the rotor is positioned downwind, air flows through the turbine head in the direction of the rotor. An airflow sensing device 118 inside the nacelle cover is responsive to the airflow. In the form shown in FIGS. 19, 20, and 21, the airflow sensing device comprises a swing door 120, which is pivoted to act in a manner similar to a flap valve. (Other types of airflow sensing devices may also be used.) When airflow through the turbine head is in the proper direction (toward the rotor) and in excess of a predetermined airflow rate, the airflow swings the door toward the rotor, i.e., opens the door, which closes a switch 122 in an electric/hydraulic control system (described more fully hereinafter). When the swing door is open, the blades are pitched to the run position.

If the turbine head yaws to where it is about 90° or more to the wind, the airflow through the turbine head will stop, and the swing door will close due to its weight, causing the blades to be pitched to a stall position. The swing door thus senses the wind velocity (speed and direction) to dictate whether the wind turbine is in a running or non-running mode.

As an example, if the rotor is not turning, in a no-wind or light-wind condition (e.g., 0–8 mph), the wind turbine may be caught in an upwind position. In this case, the swing door will be closed, and the blades will be pitched up to their stall position. With the wind turbine in the upwind position, pressure from the wind in the turbine head will keep the swing door shut, and will keep the switch open 122. The blades will start turning in a light wind (5–7 mph), and the turbine will slowly yaw around to the downwind position, whereupon the blades will stop turning, because the wind velocity is too low. Once the wind velocity increases to a predetermined level, the door swings open, and the blade pitch is changed to the run position.

The swing door should preferably have a dash-pot 124 to provide some dampening of the swing door movement, and a dead-band is preferably provided in the electric switch 122 itself or in the operating linkage. A time delay is preferably provided in the electrical circuit controlled by the switch, so that when the wind turbine is shut down by the swing door, it will not start back up for a predetermined period of time. This delay, which may be adjustable as needed, will keep the hydraulic system from going on and off in light and variable winds.

Figure 17:
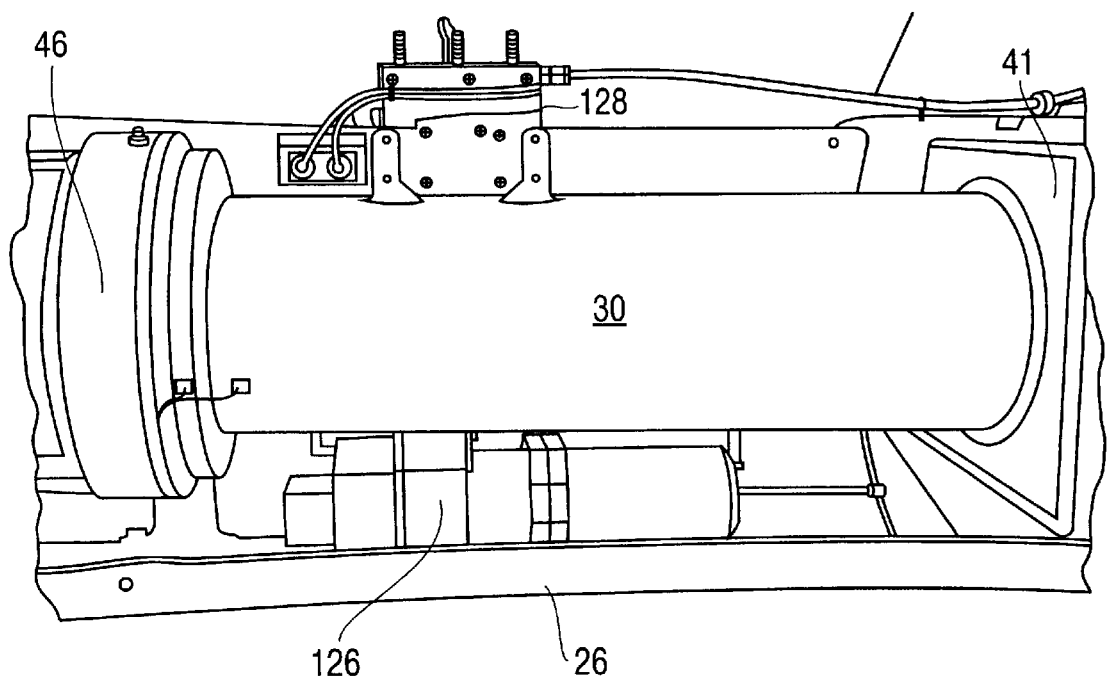
FIG. 17 is a perspective view of a low speed shaft and associated parts.
Figure 18:
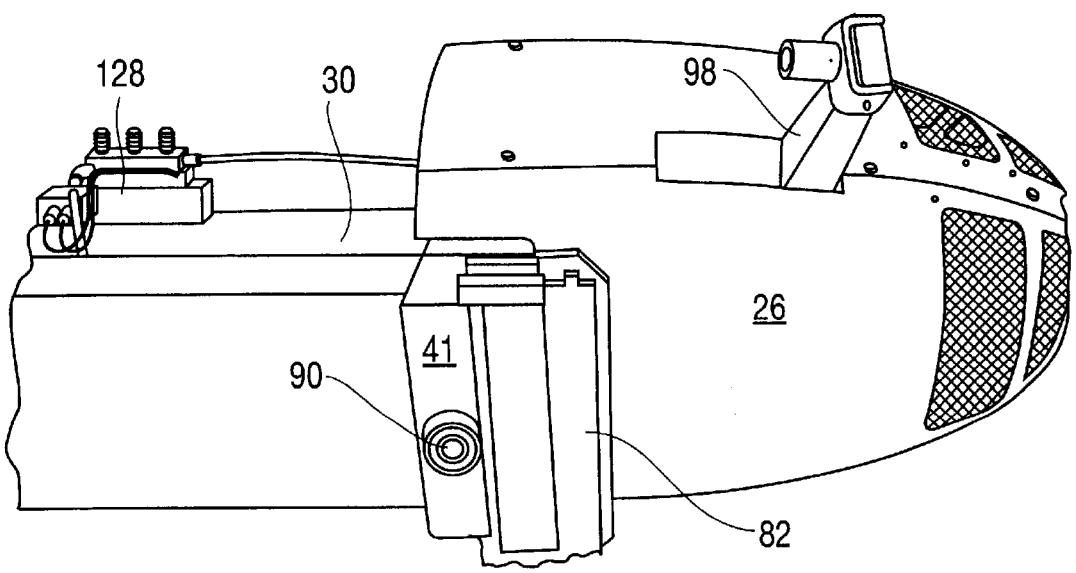
FIG. 18 is a perspective view showing-portions of a rotor.

Hydraulic pressure to the pitch actuator 112 is provided by a hydraulic unit 126 mounted on the low speed shaft 30 (FIG. 17). The blade pitch hydraulic unit is bolted to the low speed shaft on brackets and rotates within the nacelle cover. The blade pitch hydraulic unit includes a pump driven by an electric motor, an oil reservoir, and a pressure switch. A valve manifold 128 is mounted on the low speed shaft opposite to the blade pitch hydraulic unit and includes three solenoid valves that control hydraulic pressure to the pitch actuator 112. The solenoids 129 of the valves are designated in the simplified diagram of the electrical system shown in FIG. 22.

A low speed solenoid valve allows slow return of hydraulic fluid from the hydraulic cylinder of the pitch actuator 112 to the pitch pump oil reservoir. This permits the blades to slowly pitch from the run to the stall position to avoid undue loading on the wind turbine components. Two high speed solenoid valves (for redundancy) permit maximum hydraulic fluid flow and are used to quickly pitch the blades into the stall position and stop the rotor.

It will take approximately five minutes to pitch the blades from the stall to run position, at which point the pitch beam will contact a hard stop. The pressure will build in the cylinder, and the pressure switch will disable power to the pitch pump. All of the solenoid valves need to be energized to permit hydraulic fluid to be pumped into or held in the hydraulic cylinder of the actuator. Therefore, in the event of power loss, the blades will automatically pitch to their stall position as a failsafe mechanism.

Figure 22:
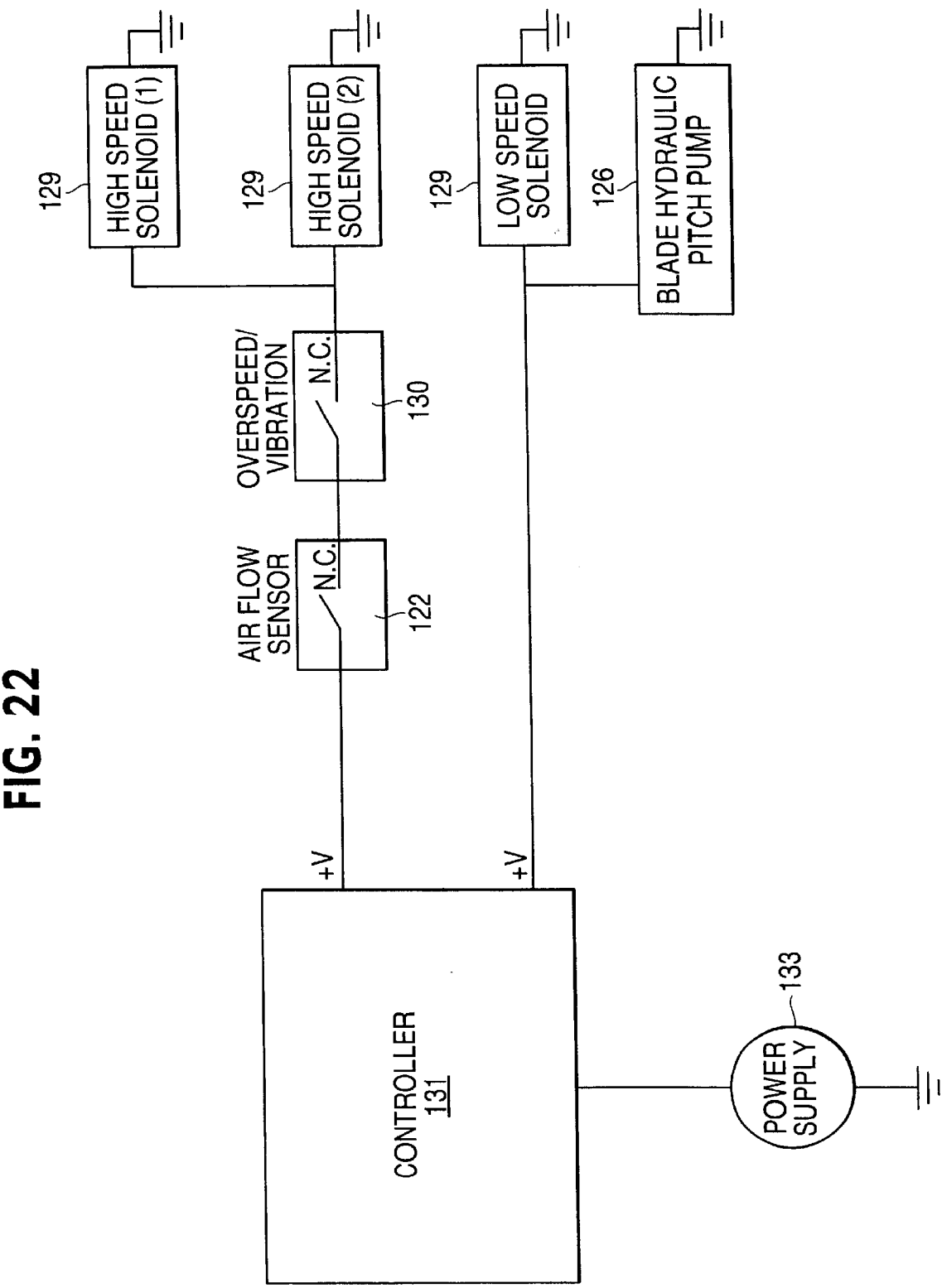
FIG. 22 is a block diagram of an electrical system of the pitch-changing mechanism.

The airflow sensor switch 122 shown in FIG. 22 is the switch operated by the swing door. Also shown is an overspeed/vibration switch 130 which shuts down the wind turbine in the event of an overspeed or high vibration condition. A controller 131 and power supply 133 are parts of the electrical system.

Among the advantages of the swing door control are that, unlike a yaw flag control system, the swing door is in a dry protected place, free from ice during winter storms, warmed by air from the generator and gearbox. The swing door prevents the rotor from turning unproductively in light winds, and it is relatively inexpensive to manufacture and service.

The pitch control mechanism of the invention is highly effective in ensuring that the rotor is oriented downwind from the tower during normal operation of the wind turbine. The flexibility of the blades allows them to cone away from the tower during normal downwind operation under the influence of aerodynamic forces, without creating high structural loads. Such downwind coning of the blades is desirable. However, if the blades were to cone in a reverse direction (upwind when the rotor is downwind or downwind when the rotor is upwind), there is the risk that a blade would strike the tower. It is desirable, therefore, to limit the ability of the blades to cone reversely.

Figures 25A, 25B:
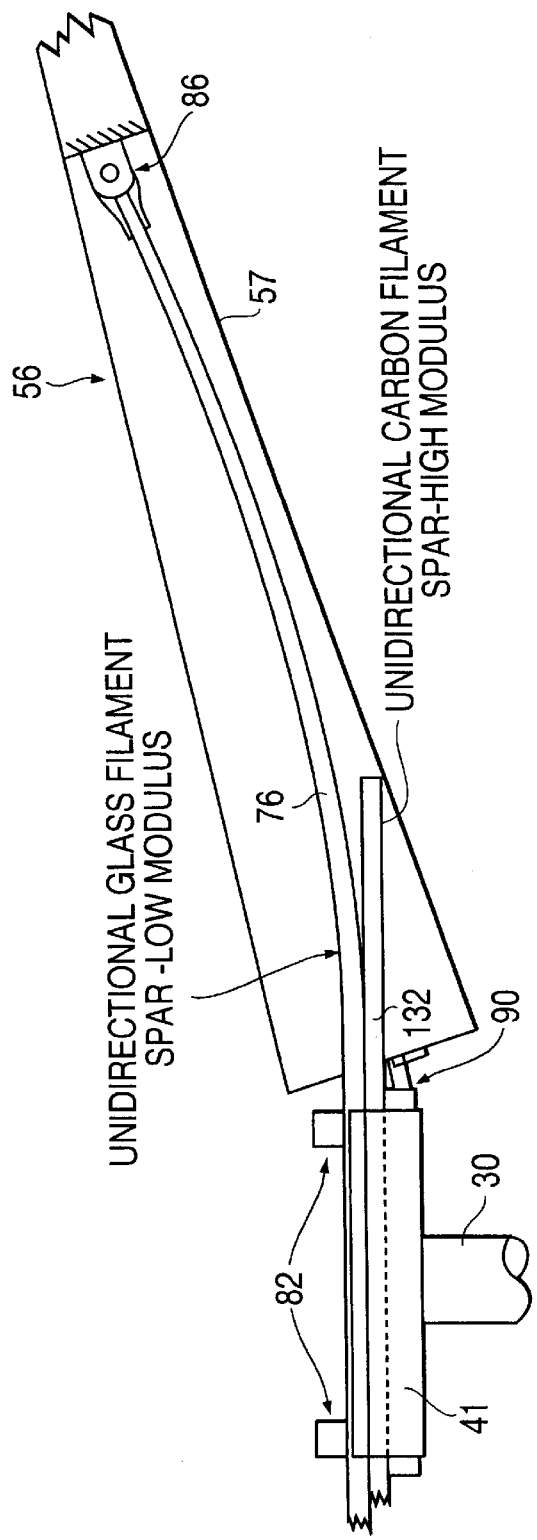
FIGS. 25A and 25B are diagrammatic views showing forward coning and reverse-coning limitation in accordance with the invention.

In the embodiment shown in FIGS. 25A and 25B, such limitation is achieved by providing a stiff spar 132 attached to the hub 41 behind the flexible spar 76. The stiff spar, which may be formed of composite carbon fiber material, for. example, keeps the flexible spar from bending backwardly to an undesirable extent. The net effect of this arrangement is that the blades have different degrees of stiffness or flexibility depending upon the bending direction. Alternatively, a stack of leaf springs may be mounted on the hub behind the flexible spar to provide increasing stiffness when the spar tends to bend backwardly and engages the springs. The turbine head is substantially balanced about the pitch axis. With zero coning, the center of gravity of the blades and flexible spar is the same horizontal distance from the pitch axis in either the light wind rotating mode or the shut-down mode. With this design, it is possible to have the turbine head slightly nose heavy under these conditions, and yet still be able to track in both pitch and yaw, when the wind is strong enough to generate.

With the turbine head substantially balanced, in an upwind condition, whether rotating or not, the blades and the flexible spar will be-positioned closer to the pitch axis, due to the pressure from the wind. This will make the nose drop down and move the blades away from the tower.

The straight hub and flexible spar take full advantage of a blade pitch change with coning. About two degrees of pitch change is required to obtain the best power curve. Pitch change with coning also gives a better start-up with a straight hub and flexible spar in light winds.

While preferred embodiments of the invention have been shown and described, it will be apparent to those skilled in the art that changes can be made without departing from the principles and spirit of the invention, the scope of which is defined in the appended claims.

What is claimed is:

1. Wind-driven downwind electric generator apparatus of the downwind type comprising a turbine head supported for wind-driven yaw movement, the turbine head including a drive shaft supported for rotation about an axis transverse to an axis of yaw movement, the drive shaft having a hub fixed transversely thereto, a flexible spar attached to the hub transversely of the drive shaft and extending from opposite ends of the hub, a pair of oppositely disposed flexible blades each having a root-rib with an opening through which a portion of the spar extends freely into a hollow portion of the blade for attachment to a midportion of the blade by a ball joint, the root-rib having a pitch pivot including a stub shaft attached to the root-rib and extending slidably into a ball joint attached to the hub, and a blade pitch changing mechanism connected to the root-rib for changing the pitch of the blade about an axis of the stub shaft.

2. Apparatus according to claim 1, wherein the spar is substantially flat and is tapered width-wise and thickness-wise, the width of the spar being transverse to the drive shaft.

3. Apparatus according to claim 1, wherein the spar is clamped to the hub.

4. Apparatus according to claim 1, wherein the pitch-changing mechanism comprises a pitch beam extending transversely of the drive shaft adjacent to the blades, the pitch beam having a shaft portion extending longitudinally into a hollow portion of the drive shaft, the pitch beam having opposite ends connected to respective root-ribs of the blades by respective pitch linkages, each pitch linkage including a tie-rod, one end of which is connected to a corresponding end of the pitch beam by a single-degree-of-freedom pivot, and the other end of which is connected to a root-rib by a ball joint, whereby the pitch beam and its shaft portion rotate with the blades, the hub, and the drive shaft, and wherein the pitch-changing mechanism moves the shaft portion inwardly and outwardly of the drive shaft to change the pitch of the blades.

5. Apparatus according to claim 1, wherein the pitch-changing mechanism is constructed to pitch the blades to a stall position in the absence of proper running conditions of the apparatus.

6. Apparatus according to claim 1, wherein the turbine head has an elongated nacelle cover with end portions at opposite sides of the yaw axis, the end portions having openings for airflow through the turbine head, and wherein the pitch-changing mechanism includes a device inside the nacelle cover that is responsive to airflow and that controls the pitch-changing mechanism to pitch the blades to a stall position in the absence of predetermined airflow conditions.

7. Apparatus according to claim 6, wherein the predetermined airflow conditions are based on the rate of airflow in a predetermined direction through the head.

8. Apparatus according to claim 6, wherein the airflow responsive device comprises an airflow operated door.

9. Wind-driven electric generator apparatus of the downwind type, comprising a turbine head supported for wind-driven yaw movement, the turbine head having rotor blades at one end and having a nacelle cover extending from said one end at one side of an axis of said yaw movement, to an opposite end at an opposite side of said yaw axis, said nacelle cover having openings at its ends and defining an airflow path between and through said openings, said blades having a pitch-changing mechanism for changing the pitch of the blades, said mechanism including an airflow responsive device inside said nacelle cover for changing the pitch of said blades depending on predetermined airflow conditions.

10. Apparatus according to claim 9, wherein said device includes an airflow operated door.

11. Apparatus according to claim 9, wherein said airflow conditions are based on desired operating conditions of said apparatus.

12. Apparatus according to claim 11, wherein said pitch-changing mechanism pitches said blades to a stall position in the absence of said desired operating conditions.

13. Apparatus according to claim 1, further comprising a device that limits the ability of the blades to cone reversely.

14. Apparatus according to claim 13, wherein said device comprises a stiff spar supported on the hub adjacent to and behind the flexible spar, whereby bending of the flexible spar in a reverse coning direction is limited.

15. Wind-driven electric generator apparatus of the downwind type, comprising a turbine head supported for yaw movement, the turbine head including a drive shaft supported for rotation about an axis transverse to an axis of the yaw movement, the drive shaft having a hub thereon and blades attached to the hub by a mechanism that permits the blades to change pitch, and a blade pitch changing mechanism that comprises a pitch beam having a first portion extending longitudinally of the drive shaft and a second portion extending transversely of the drive shaft and connected to the blades by respective pitch linkages, each pitch linkage including a tie-rod, one end of which is connected to the second portion of the pitch beam by a single-degree-of-freedom pivot and an opposite end of which is connected to a blade by a ball joint, whereby the pitch beam rotates with the drive shaft, and wherein the pitch-changing mechanism moves the first portion of the pitch beam along the drive shaft to change the pitch of the blades.

16. Apparatus according to claim 15, wherein the pitch-changing mechanism is constructed to pitch the blades to a stall position in the absence of proper running conditions of the apparatus.

17. Apparatus according to claim 15, wherein the turbine head has a cover with end portions having openings for airflow through the turbine head, and wherein the pitch-changing mechanism includes a device inside the cover that is responsive to airflow therein and that controls the pitch-changing mechanism to pitch the blades to a stall position in the absence of predetermined airflow conditions.

18. Apparatus according to claim 17, wherein the predetermined airflow conditions are based on the rate of airflow in a predetermined direction through the turbine head.

19. Apparatus according to claim 17, wherein the airflow responsive device comprises an airflow operated door.

20. Wind-driven electric generator apparatus of the downwind type, comprising a turbine head supported for yaw movement, the turbine head including a drive shaft supported for rotation about an axis transverse to an axis of the yaw movement, the drive shaft having a hub thereon with flexible blades, each blade being connected to the hub by a mechanism that comprises a pitch pivot including a stub shaft extending slidably into a ball joint, whereby the pitch of the blades can be changed and the blades can cone.

21. Apparatus according to claim 20, wherein each blade has a root rib and the pitch pivot of each blade is connected between the root rib of the blade and the hub.

22. Apparatus according to claim 20, wherein the ball joint is attached to the hub and the stub shaft is attached to the root rib.

23. Apparatus according to claim 20, further comprising a pitch-changing mechanism connected to the blades for changing the pitch of each blade about an axis of a corresponding stub shaft.

24. Apparatus according to claim 20, wherein the pitch changing mechanism comprises a pitch beam having a first portion extending longitudinally of the drive shaft and a second portion extending transversely of the drive shaft and connected to the blades by respective pitch linkages, each pitch linkage including a tie-rod, one end of which is connected to the second portion of the pitch beam by a single-degree-of-freedom pivot and an opposite end of which is connected to a blade by a ball joint, whereby the pitch beam rotates with the drive shaft, and wherein the pitch-changing mechanism moves the first portion of the pitch beam along the drive shaft to change the pitch of the blades.

25. Apparatus according to claim 20, wherein the mechanism that connects each blade to the hub includes a flexible spar extending from the hub into a hollow portion of the blade and connected to the blade by a pivot at a point intermediate the length of the blade.

26. Apparatus according to claim 25, wherein the pivot includes a ball joint.

27. Apparatus according to claim 25, wherein the spar is clamped to the hub.

28. Apparatus according to claim 25, wherein the spar is substantially flat and is tapered width-wise and thickness-wise, the width of the spar being transverse to the drive shaft.

29. Apparatus according to claim 25, further comprising a device that limits the ability of the blades to cone reversely.

30. Apparatus according to claim 29, wherein said device comprises a stiff spar supported on the hub adjacent to and behind the flexible spar, whereby bending of the flexible spar in a reverse coning direction is limited.

31. Wind-driven electric generator apparatus of the downwind type, comprising a turbine head supported for yaw movement, the turbine head including a drive shaft supported for rotation about an axis transverse to an axis of the yaw movement, the drive shaft having a hub thereon and blades attached to the hub by a mechanism that permits the blades to change pitch, and a blade pitch-changing mechanism connected to the blades, wherein the turbine head has a cover with end portions having openings for airflow through the turbine head, and wherein the pitch-changing mechanism includes a device inside the cover that is responsive to airflow therein and that controls the pitch-changing mechanism to pitch the blades to a stall position in the absence of predetermined airflow conditions.

32. Apparatus according to claim 31, wherein the predetermined airflow conditions are based on the rate of airflow in a predetermined direction through the turbine head.

33. Apparatus according to claim 32, wherein the airflow responsive device comprises an airflow operated door.

\* \* \* \* \*